(12) United States Patent
Hull et al.

(10) Patent No.: US 8,922,081 B2
(45) Date of Patent: Dec. 30, 2014

(54) NESTED-ROTOR OPEN-CORE FLYWHEEL

(75) Inventors: John R. Hull, Sammamish, WA (US); Michael Strasik, Sammamish, WA (US); John A. Mittleider, Kent, WA (US); Mark S. Wilenski, Mercer Island, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 395 days.

(21) Appl. No.: 13/438,027

(22) Filed: Apr. 3, 2012

(65) Prior Publication Data

US 2013/0261001 A1    Oct. 3, 2013

(51) Int. Cl.
*F16F 15/30* (2006.01)
*H02K 7/02* (2006.01)
*H02K 7/09* (2006.01)

(52) U.S. Cl.
USPC ......... 310/74; 310/114; 310/90.5; 74/572.11; 74/572.12

(58) Field of Classification Search
USPC ............... 310/74, 90.5, 114; 74/572.4, 572.1, 74/572.21, 574.1, 572.11, 572.12
See application file for complete search history.

(56) References Cited

U.S. PATENT DOCUMENTS

| | | | | |
|---|---|---|---|---|
| 4,088,041 A | * | 5/1978 | Kraus | 74/572.1 |
| 5,124,605 A | * | 6/1992 | Bitterly et al. | 310/74 |
| 5,214,981 A | * | 6/1993 | Weinberger et al. | 74/572.1 |
| 5,256,638 A | * | 10/1993 | Weinberger et al. | 505/166 |
| 5,540,116 A | * | 7/1996 | Hull et al. | 74/572.11 |
| 5,640,887 A | * | 6/1997 | Hull et al. | 74/572.11 |
| 5,760,506 A | | 6/1998 | Ahlstrom et al. | |
| 6,448,679 B1 | * | 9/2002 | Imlach | 310/90.5 |
| 6,570,286 B1 | * | 5/2003 | Gabrys | 310/90.5 |
| 6,825,588 B2 | * | 11/2004 | Gabrys et al. | 310/90.5 |
| 6,873,235 B2 | * | 3/2005 | Fiske et al. | 335/306 |
| 2010/0072847 A1 | * | 3/2010 | Fields et al. | 310/153 |
| 2010/0231075 A1 | | 9/2010 | Han et al. | |

OTHER PUBLICATIONS

Zhang, Y., et al., "Polymer-Embedded Carbon Nanotube Ribbons for Stretchable Conductors," 2010, Adv. Mater., vol. 22, pp. 3027-3031.
Zhao, H., et al., "Carbon Nanotube Yarn Strain Sensors," 2010, Nanotechnology, vol. 21, 305502.
Bradford, P.D., et al., "A Novel Approach to Fabricate High Volume Fraction Nanocomposites With Long Aligned Carbon Nanotubes," Compo Sci. Technol., 2010, vol. 70, pp. 1980-19.
Pantano, A., et al., "Mechanics of Deformation of Single- and Multi-Wall Carbon Nanotubes," J. Mechanics and Physics of Solids, 2004, vol. 52, pp. 789-821.
Pathak, S.K., et al., "Fabrication of High Performance Y-123/Y-24111/Ag Single Grain Composites," Physica C, 2009, vol. 469, pp. 1173-1176.
Pathak, S.K., et al., "Processing and Properties of Large Grain Y—Ba—Cu—O Containing Y2Ba4CuWOY (Y-24W1) and Ag Second Phase Inclusions," J. Appl. Phys., 2009, vol. 106, 06392.

(Continued)

*Primary Examiner* — Burton Mullins
(74) *Attorney, Agent, or Firm* — Smith Moore Leatherwood LLP

(57) ABSTRACT

Methods and apparatuses are disclosed for incorporating a plurality of independently rotating rotors made from high-strength materials with a high-temperature superconductive (HTS) bearing technology into an open-core flywheel architecture to achieve a desired high energy density in the flywheel energy storage devices and to obtain superior results and performance.

18 Claims, 10 Drawing Sheets

(56) References Cited

OTHER PUBLICATIONS

Sammalkorpi, M., et al., "Mechanical Properties of Carbon Nanotubes With Vacancies and Related Defects," Physical Review B, 2009, vol. 70, 245416.

Shokrieh, M.M. and Rafiee, R., "Investigation of Nanotube Length Effect on the Reinforcement Efficiency in Carbon Nanotube Based Composites," Composite Structures, 2010, Vol.

Strasik, M., et al., "Design, Fabrication, and Test of a 5-kWh/100-kWh Flywheel Energy Storage Utilizing a High-Temperature Superconducting Bearing," IEEE Trans. Appl. Superc, (2010).

Strasik, M., et al., "Performance of a Conduction-Cooled High-Temperature Superconducting Bearing," Mat. Sci. Eng. B, 2008, vol. 151, pp. 195-198.

Strasik, M., et al., "Overview of Boeing Flywheel Energy-Storage Systems With High-Temperature Superconducting Bearings," Supercond. Sci. Technol., 2010, vol. 23, 034021.

Strubhar, J.L., et al., "Lightweight Containment for High-Energy Rotating Machines," IEEE Trans. Magn., 2003, vol. 39, pp. 378-383.

Sun, X. and Zhao, W., "Prediction of Stiffness and Strength of Single-Walled Carbon Nanotubes by Molecular-Mechanics Based Finite Element Approach," Materials Science and Engi, (2004).

Švrček, V., et al., "Filling and Capping Multiwall Carbon Nanotubes With Silicon Nanocrystals Dispersed in SiO2-Based Spin on Glass," J. Appl. Phys., 2006, vol. 99 064306.

Unger, R. and Keiter, D., "The Development of Cryotel™ Family of Coolers," AIP Conf. Proc. 2004, vol. 719, pp. 1404-1409.

Wardle, B.L., et al., "Fabrication and Characterization of Ultrahigh-Volume-Fraction Aligned Carbon Nanotube-Polymer Composites," Adv. Mater., 2008, vol. 20, pp. 2707-2714.

Wei, C., et al., "Tensile Strength of Carbon Nanotubes Under Realistic Temperature and Strain Rate," Physical Review B, 2003, vol. 67, 115407.

Weinberger, B.R., et al., "Low Friction in High Temperature Superconductor Bearings," Appl. Phys. Lett., 1991, vol. 59, pp. 1132-1134.

Yakobson, B.I., et al., "High Strain Rate Fracture and C-Chain Unraveling in Carbon Nanotubes," Computational Materials Science, 1997, vol. 8 pp. 341-348.

Yu, M., et al., "Strength and Breaking Mechanism of Multiwalled Carbon Nanotubes Under Tensile Load," Science, 2000, vol. 287, p. 637.

Yu, M., et al., "Controlled Sliding and Pullout of Nested Shells in Individual Multiwalled Carbon Nanotubes," J Phys. Chem. B, 2000, vol. 104, pp. 8764-8767.

Zhang, X., et al., "Ultrastrong, Stiff, and Lightweight Carbon-Nanotube Fibers," 2007, Adv. Mater., vol. 19, pp. 4198-4201.

Zhang, Y., et al., "Tailoring the Morphology of Carbon Nanotube Arrays: From Spinnable Forests to Undulating Foams," 2009, ACSNano, vol. 3, pp. 2157-2162.

Ashley S. et al. "Designing Safer Flywheels," Mechanical Engineering, 1996, vol. 118, No. 11, pp. 88-91.

Barber, A.H. et al., "Stochastic Strength of Nanotubes: An Appraisal of Available Data," Composites Science and Technology, 2005, vol. 65, pp. 2380-2384.

Basinger, S.A., et. al. "Amplitude-Dependence of Magnetic Stiffness in Bulk High-Temperature Superconductors," Appl. Phys. Lett., 1990, vol. 57, pp. 2942-2944.Bradford, P.D.

Cebeci, H., et. al., "Multifunctional Properties of High Volume Fraction Aligned Carbon Nanotube Polymer Composites With Controlled Morphology," Composites Science and Technol, (2009).

Chae, H.G., et al., "Stabilization and Carbonization of Gel Spun Polyacryolonitrile/Single Wall Carbon Nanotube Composite Fibers," Polymer, 2007, vol. 48, pp. 3781-3789.

Chae, H.G., et al., "Making strong fibers," Science, 2008, vol. 319, pp. 908-909.

Coleman, J.N., et al., "Small But Strong: A Review of the Mechanical Properties of Carbon Nanotube-Polymer Composites," Carbon, 2006, vol. 44, pp. 1624-1652.

Cumings, J. and Zettl, A., "Low-Friction Nanoscale Linear Bearings From Multiwall Carbon Nanotubes," Science, 2000, vol. 289, pp. 602-604.

Dumitrica, T., et al., "Selective Cap Opening in Carbon Nanotubes Driven by Laser-Induced Coherent Phonons," Physical Review Letters, 2004, vol. 92, No. 11.

Huhtala, M., et al., "Improved Mechanical Load Transfer Between Shells of Multiwalled Carbon Nanotubes," Physical Review B, 2004, vol. 70, 045404.

Hull, J.R., et al., "Velocity Dependence of Rotational Loss in Evershed-Type Superconducting Bearings," Appl. Phys. Lett., 1997, vol. 70, pp. 655-657.

Hull, J.R. "Superconducting Levitation," Encyclopedia of Electrical and Electronics Engineering, 1999, vol. 20, pp. 729-734 (ed. J. G. Webster), John Wiley and Sons, New York.

J. Hull, "Superconducting Bearings," Supercond. Sci. Technol., 2000, vol. 13, pp. R1-R14.

Hull, J.R. and Murakami, M., "Applications Of Bulk High-Temperature Superconductors," Proceedings IEEE, 2004, vol. 92, pp. 1705-1718.

Hull, J.R., "Levitation Applications of High-Temperature Superconductors," High Temperature Superconductivity 2: Engineering Applications, ed. A V. Narlikar, Springer, Berlin, (2004), pp. 91-142.

Hull, J., et al., "High Rotational-Rate Rotors With High-Temperature Superconducting Bearings," IEEE Trans. Appl. Supercond., 2009, vol. 19, pp. 2078-2082.

Jia, J., et al., "A Comparison Of The Mechanical Properties Of Fibers Spun From Different Carbons Nanotubes," Carbon, 2011, vol. 49, pp. 1333-1339.

Jiang, B., et al., "Maximum Nanotube Volume Fraction And Its Effect On Overall Elastic Properties Of Nanotube-Reinforced Composites," Composites: Part B, 2009, vol. 40, pp. 21.

Mora, R.J., et al., "Properties of Composites Of Carbon Nanotube Fibres," Composites Science And Technology, 2009, vol. 69, pp. 1558-1563.

Mulcahy, T.M., et al., "Test Results Of 2-kWh Flywheel Using Passive PM And HTS Bearings," IEEE Trans. Appl. Supercond., 2001, vol. 11, pp. 1729-1732.

* cited by examiner

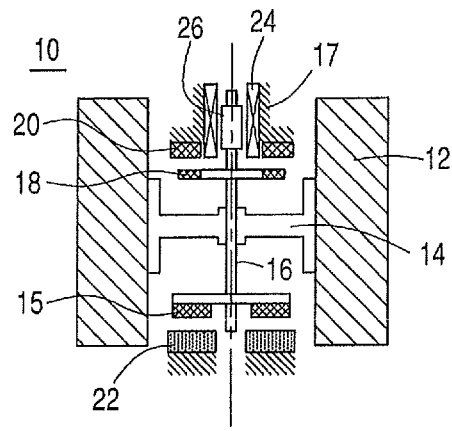
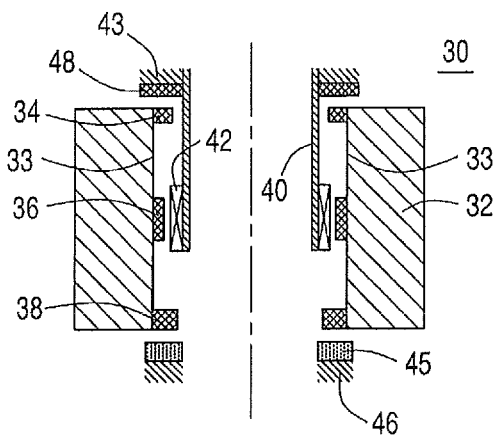
FIG. 1a
(PRIOR ART)
FIG. 1b
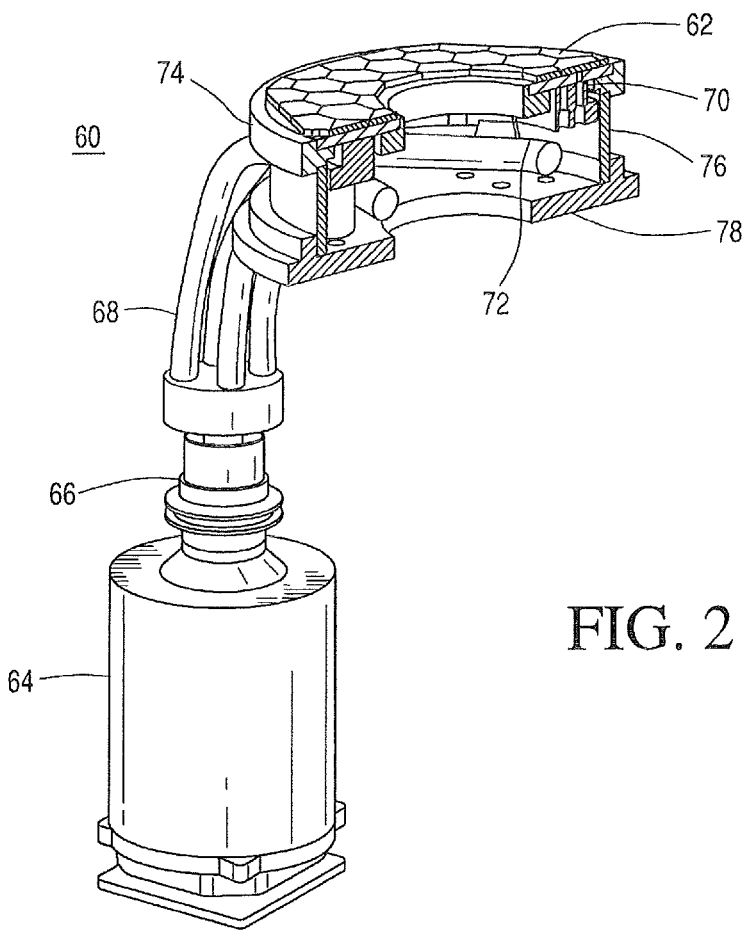
FIG. 2

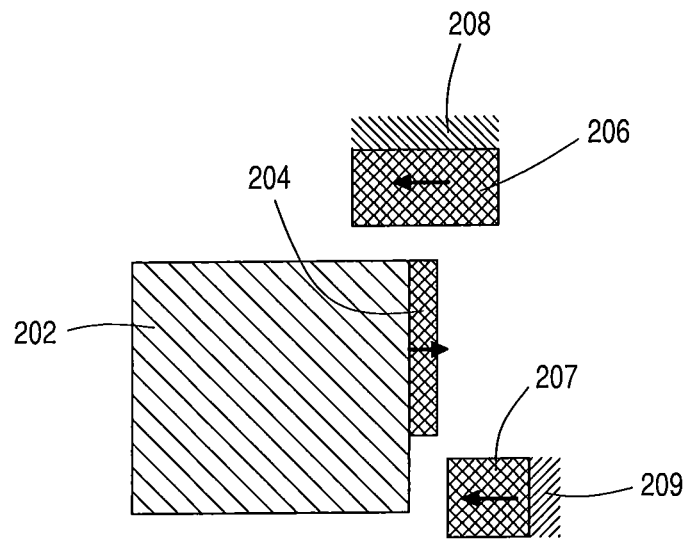
FIG. 8e
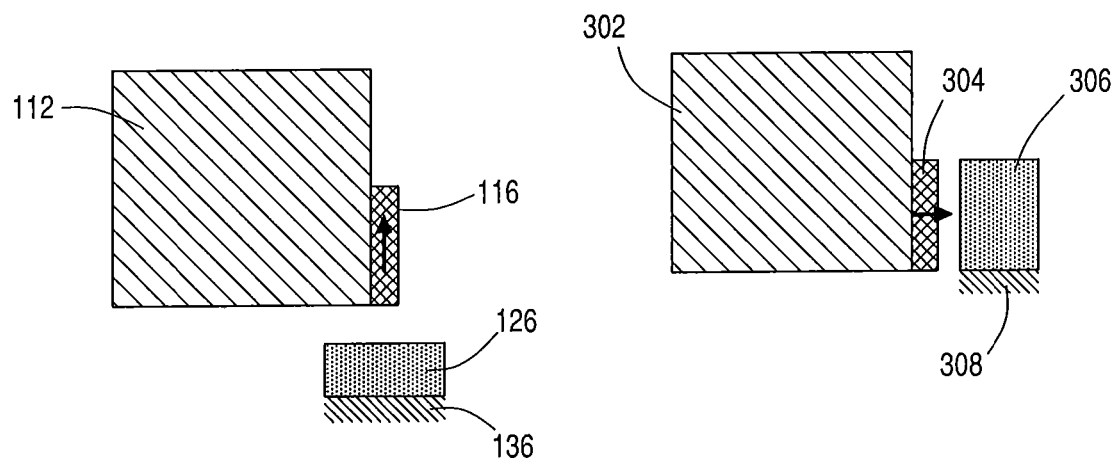
FIG. 9a
FIG. 9b

NESTED-ROTOR OPEN-CORE FLYWHEEL

TECHNOLOGICAL FIELD

The present disclosure relates to flywheel energy storage devices and, more particularly, to hubless, or open-core flywheel storage devices having improved stability and performance.

BACKGROUND

Flywheel energy storage devices and systems are known for storing energy and releasing stored energy on demand. Known flywheel assemblies have a traditional rotor design sometimes made with carbon fiber composites. Such rotors have a shaft on which the motor/generator (M/G) and bearing permanent magnets (PMs) are mounted. The shaft is conventionally connected to the rim via a hub. The shaft-and-hub flywheel design is limited in terms of its achievable upper-end velocity. Matching useable materials for components in the flywheel assembly has been problematic since the radial growth of the components varies as the rotor velocity increases. The hub must mechanically couple the shaft to the rim without introducing bending modes into the rotor structure through the range of operating frequencies in the operating speed range of the flywheel. However, the shaft often exhibits negligible radial growth while the rim exhibits significant radial growth.

Therefore, the higher speeds for flywheels enabled by the use of ever-advancing materials unfortunately exacerbates the growth-matching problem for the hub as the increased radial growth of the rim outpaces any growth exhibited by other connected components such as, for example, the connecting shaft. Further, the overall efficiency afforded by flywheel technology is limited by the presently available materials that fail when the flywheel is run at speeds that exceed material tolerances.

In addition, while a high energy density is desired to achieve the maximum energy storage and deployment, the energy density that is achievable in known flywheel assemblies is limited. Further, it is often difficult to reach a flywheel system's energy storage and deployment maximum capacity due to the existence of net angular momentum, and space restrictions often prohibit the usefulness of flywheel technology.

BRIEF SUMMARY

The present disclosure is directed to a flywheel and flywheel architecture that eliminates the material growth-matching problem and obviates radial growth and bending mode issues that otherwise occur at various frequencies and speeds. More specifically, variations disclosed herein are directed to flywheel assemblies having an "open-core" (hubless) architecture as opposed to a shaft- and hub architecture.

Variants of present disclosure are directed to a novel open-core flywheel energy storage system that will obtain high energy, power-density and efficiency, while having a significantly reduced size profile. The flywheel storage system comprises high-temperature superconducting (HTS) bearings and multiple rotors comprising high-strength materials. The desired properties inherent in the rotors result in significantly improved flywheel performance in terms of significantly increased speed, increased power storage/generation and increased system durability.

According to the present disclosure, a flywheel system and unit are disclosed that can be used for energy storage. A vacuum chamber contains a plurality of nested rotor rings or cylinders (hereinafter referred to as "rotors"), with each rotor operating as an independent flywheel. In a preferred variation, at least one of the rotors is a counter-rotating rotor. Each rotor is preferably suspended by a passively stable magnetic bearing comprising a permanent magnet (PM) lift bearing and a HTS stability bearing at either end of the rotor. Rotor PMs are desirably and predictably positioned along the inner surface of each rotor, and a coldhead of a small cryocooler thermally conducts to the HTS to preserve a desired operating temperature. Preferably, a small turbo-molecular or getter-sublimation pump maintains the vacuum inside the chamber containing the entire assembly.

More specifically, the present disclosure is directed to a flywheel system for storing and releasing energy comprising a substantially cylindrical rotor assembly within a vacuum chamber, the assembly comprising a plurality of rotors having an inner and outer surface and preferably comprising a high-strength material, such as, for example, carbon fiber, glass fiber, metals, and combinations thereof, etc. Each rotor preferably comprises a carbon-fiber-containing, glass-fiber-containing or metal-containing material (or a combination thereof) with the material preferably having a tensile strength of from about 2 GPa to about 60 GPa. At least one stator assembly is provided and positioned in close proximity with the rotor assembly, preferably in an open-core architecture. A plurality of rotor magnets are affixed to the inner surface of the rotor and the stator and are positioned relative to one another to facilitate levitation of the rotor during operation. Preferably, the rotor achieves a velocity at its outer radius of from about 300 m/s to about 3000 m/s during operation. The carbon-fiber-containing, glass-fiber-containing or metal-containing material preferably comprises a matrix of materials selected from the group consisting of graphite, E-glass, S-glass, silica, aluminum, titanium, steel and combinations thereof. One particularly preferred material is a carbon nanotube-containing material, and is preferably a single-walled carbon nanotube-containing material.

Each rotor has a different radius, such that rotors having smaller radii can "nest" within rotors having larger radii. The preferred flywheel assembly further comprises a plurality of stator assemblies, with each stator assembly in close proximity with a rotor assembly. At least one rotor magnet is affixed to the inner surface of each rotor, and at least one stator magnet is affixed to each stator, such that the rotor magnets and stator magnets are positioned relative to one another to facilitate levitation of the rotor during operation.

Further the present disclosure is directed to a method for storing energy for subsequent release upon demand comprising the steps of providing, in a vacuum chamber, a flywheel assembly comprising a substantially cylindrical rotor assembly comprising a plurality of rotors. Each rotor preferably comprises a high-strength material, such as, for example, carbon fiber, glass fiber, metals, and combinations thereof, etc. A carbon nanotube-containing material is particularly preferred. The rotor preferably comprises a carbon-fiber-containing, glass-fiber-containing or metal-containing material (or a combination thereof) with the material having a tensile strength of from about 2 GPa to about 60 GPa. A stator assembly is provided and positioned in close proximity with the rotor assembly, preferably in an open-core architecture. At least one rotor magnet is affixed to the inner surface of the rotor and the stator, and are positioned relative to one another to facilitate levitation of the rotor during operation. Preferably, the rotor achieves a velocity at its outer radius of from about 300 m/s to about 3000 m/s during operation. The carbon-fiber-containing, glass-fiber-containing or metal-containing material preferably comprises a matrix of materials selected from the group consisting of graphite, E-glass, S-glass, silica, aluminum, titanium, steel and combinations thereof. One particularly preferred material is a carbon nanotube-containing material, and is preferably a single-walled carbon nanotube-containing material.

Each rotor has a different radius such that rotors having smaller radii can "nest" within rotors having larger radii. The assembly further comprises a plurality of stator assemblies, with a stator assembly in close proximity with a rotor assembly. A plurality of rotor magnets are affixed to the inner surface of each rotor, and a plurality of stator magnets are affixed to each stator. A current is then applied to the stator of each flywheel assembly to enable each rotor to achieve a velocity at its outer radius of from about 300 m/s to about 3000 m/s during operation.

Still further, the present disclosure is directed to vehicles comprising, as a supplementary or primary energy source, a flywheel system for storing and releasing energy comprising a substantially cylindrical rotor assembly within a vacuum chamber, with the assembly comprising a plurality of rotors, each preferably comprising a high-strength material.

Preferably, the rotors each achieve a circumferential velocity at their outer radius of from about 300 m/s to about 3000 m/s during operation. The preferred rotors comprise a material such as, for example, glass fibers, carbon fibers, metals, and combinations thereof, etc. with carbon nanotube-containing materials including multi-walled carbon nanotube-containing materials being particularly preferred In some alternatives, the flywheel assemblies of the present disclosure have particular usefulness as a sustainable power source for use in stationary or mobile applications including manned and unmanned vehicles, including aircraft, spacecraft and terrestrial and surface and sub-surface water-borne vehicles, etc.

BRIEF DESCRIPTION OF THE DRAWING(S)

Having thus described variations of the disclosure in general terms, reference will now be made to the accompanying drawings, which are not necessarily drawn to scale, and wherein:

FIG. 1(a) is a cross-sectional view of a prior art shaft-and-hub flywheel assembly;

FIG. 1(b) is a cross-sectional view of an open-core flywheel assembly;

FIG. 2 is a partially exploded view of a high-temperature superconducting bearing;

FIGS. 8(a)-8(e) and 9(a) and 9(b) are close-up cross-sectional views of various bearing configurations and magnetizations.

Figure 10:
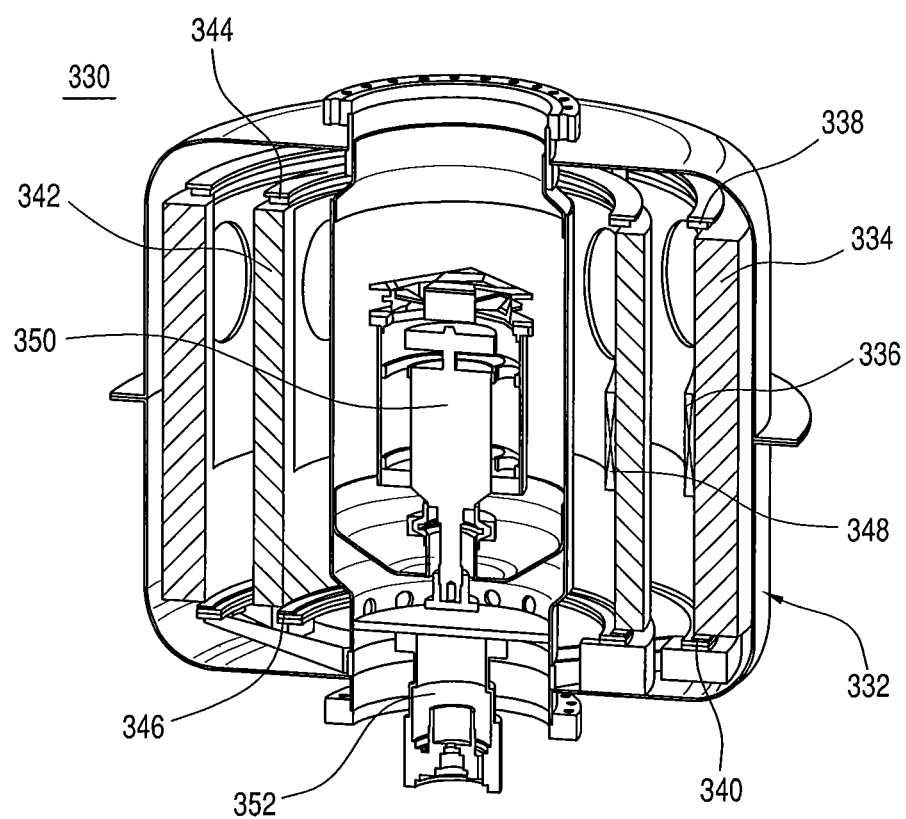
Figure 11:
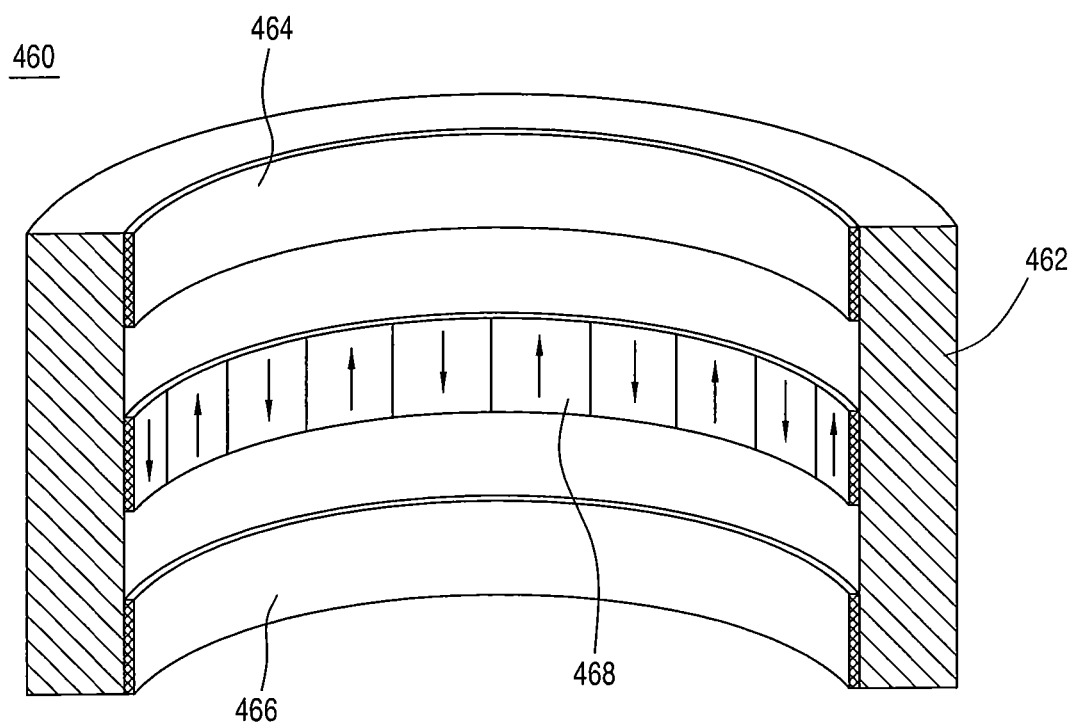
Figure 12:
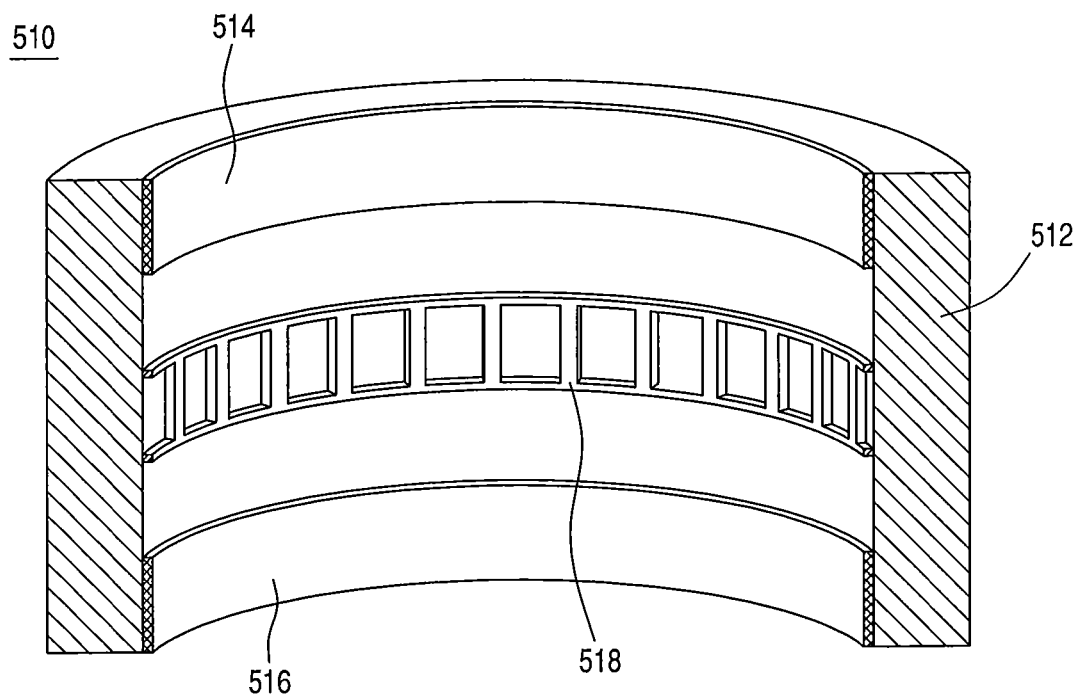
Figure 13:
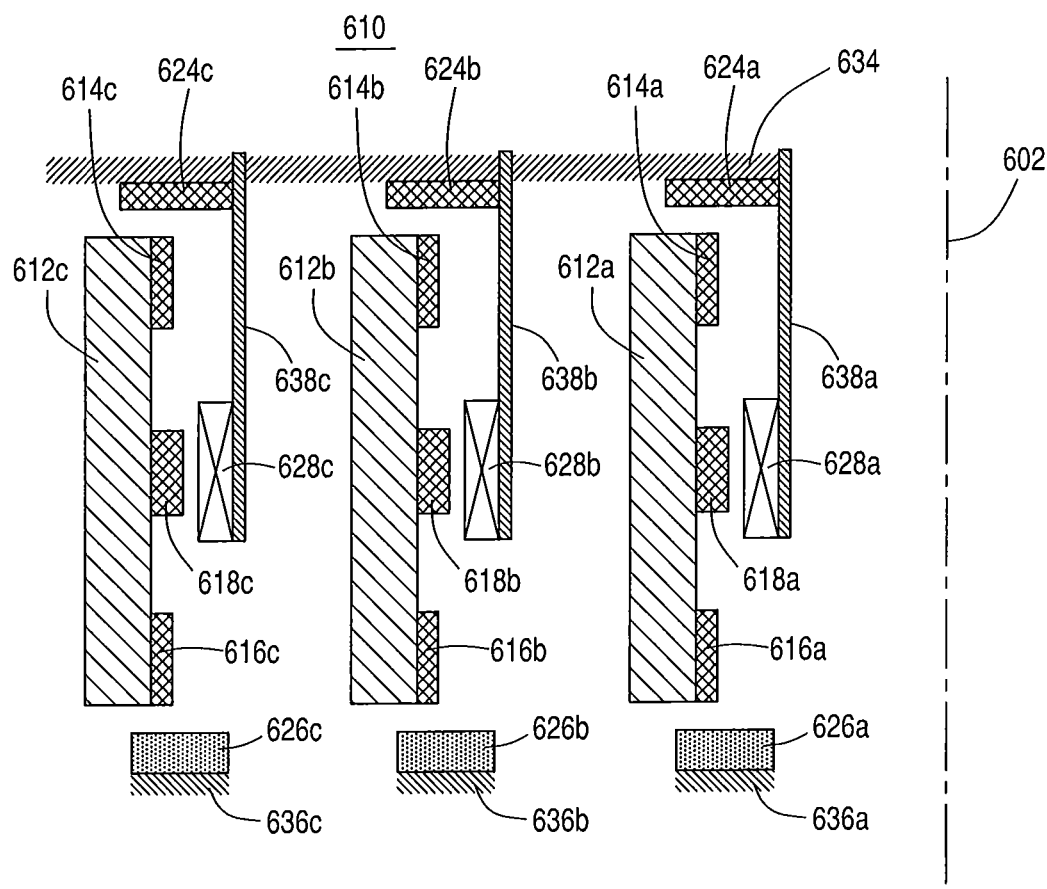

FIG. 10 is a cut-away view showing multiple nested rotors contained in an open-core architecture of a flywheel;

FIG. 11 is a cut-away view showing an inner surface of a rotor showing PMs with direction of magnetization; and FIG. 12 is a cut-away view showing an inner surface of a rotor showing PMs and a copper conductor; and FIG. 13 is schematic drawing showing three nested rotors.

DETAILED DESCRIPTION

According to the present disclosure there are several key technologies that are incorporated into the open-core flywheel architecture to achieve the desired high energy density in the flywheel energy storage devices to obtain superior results and performance. Such advances include incorporating rotors made from high-strength materials, and incorporating a plurality of rotors in an open-core flywheel architecture with a high-temperature superconductive (HTS) bearing technology.

According to the present disclosure, the rotors preferably comprise high-strength materials such as, for example, carbon fiber-containing, glass fiber-containing, metal-containing materials and combinations thereof, etc. Carbon nanotubes (CNTs)-containing materials are particularly preferred. Such materials are allotropes of carbon with a cylindrical nanostructure. Nanotubes have been constructed with length-to-diameter ratio of up to 132,000,000:1, significantly larger than for any other material. These cylindrical carbon molecules have unusual properties that are valuable for nanotechnology, electronics, optics and other fields of material science and technology. Because of their thermal conductivity and mechanical and electrical properties, carbon nanotubes find applications as additives to various structural materials. Carbon nanotubes are categorized as single-walled nanotubes (SWCNTs) and multi-walled nanotubes (MCWNTs). Individual nanotubes naturally align themselves into "ropes" held together by van der Waals forces, more specifically, pi-stacking.

CNTs are among the strongest and stiffest materials yet discovered in terms of tensile strength and elastic modulus respectively. This strength results from the covalent $sp^2$ bonds formed between the individual carbon atoms. A MWCNT was tested to have a tensile strength of 63 gigapascals (GPa). For illustration, this translates into the ability to endure tension of a weight equivalent to 6422 kg on a cable with cross-section of 1 $mm^2$. Individual CNT shells have strengths of up to about 100 GPa. Since carbon nanotubes have a low density for a solid of from about 1.3 to about 1.4 $g/cm^3$, their specific strength of up to about 48,000 $kN·m·kg^{-1}$ is the best of known materials, compared to, for example, high-carbon steel at about 154 $kN·m·kg^{-1}$.

Although the strength of individual CNT shells is extremely high, weak shear interactions between adjacent shells and tubes leads to significant reductions in the effective strength of multi-walled carbon nanotubes and carbon nanotube bundles down to only a few GPa's. However, applying high-energy electron irradiation, which crosslinks inner shells and tubes, effectively increases the strength of these materials to about 60 GPa for multi-walled carbon nanotubes and about 17 GPa for double-walled carbon nanotube bundles.

Standard single-walled carbon nanotubes (SWCNTs) can withstand a pressure up to about 24 GPa without deformation. They then undergo a transformation to superhard phase nanotubes. Maximum pressures measured using current experimental techniques are about 55 GPa. However, these new superhard phase nanotubes collapse at an even higher, albeit unknown, pressure.

Multi-walled carbon nanotubes (MWCNT) have multiple concentric nanotubes precisely nested within one another. These CNTs exhibit a striking telescoping property whereby an inner nanotube core may slide, almost without friction, within its outer nanotube shell, thus creating an atomically perfect linear or rotational bearing.

According to the present disclosure, CNTs are used directly in the manufacture of the composite rotors. MWCNT yarns having a density of about 0.2 gm/cm$^3$ are believed to yield a conservative minimal material strength of at least about 45 GPa, for twist-free composite structures.

The preferred CNTs used are specifically formulated by controlling the degree of orientation and volume fraction in a matrix to afford the finished composite material and product desired physical properties (such as, for example, higher rotor tensile strengths) than are presently known.

The preferred CNTs for use in the fabrication of the rotors preferably have a physical wall thickness of about 0.075 nm, and an effective wall thickness of about 0.34 nm with a physical wall strength of from about 150 to about 260 GPa. This provides a preferred material having volume fractions of up to about 65% of 30 nm diameter MWCNTs with metallic, glassy and/or polymeric matrices. Inducing defects into the MWCNTs is believed to improve inter-wall strength to improve mechanical load transfer between the MWCNT strands to inner strand "walls" by a factor of about 2.

According to the present disclosure, the preferred HTS bearing also contributes significantly to achieving maximum velocity of the flywheel assemblies. The HTS bearing remains passively stable so long as the temperature of the HTS components remains below about 80 K. The heat capacity of the HTS together with low heat leak into the HTS results in maintaining a sufficiently low temperature to keep stability and operate the bearing for tens of minutes after removal of the cooling source. A preferred HTS assembly is shown in FIG. 2. According to a preferred variation, the HTS bearing comprises a stator component that is positioned immediately below the rotor and comprises HTS crystals in contact with a cryostat or cryocooler. Each crystal is a melt-textured single-domain yttrium-barium copper oxide (YBCO) pellet. The YBCO components are usually shaped as hexagons with a preselected tip-to-tip dimension and thickness. The coldhead of a cryocooler is then preferably positioned in contact with the HTS array, often connected to array by means of a copper cold finger connected to a copper plate. The HTS crystals are positioned immediately above the copper plate, often attached thereto with a cryogenic epoxy.

Some variants of the present disclosure will now be described more fully hereinafter with reference to the accompanying drawings, in which some, but not all variations of the disclosure are shown. Indeed, the present disclosure may be embodied in many different forms and should not be construed as limited to the variations set forth herein. Instead, these illustrative variations are provided so that this disclosure will be thorough and complete, and will fully convey the scope of the disclosure to those skilled in the art. For example, unless otherwise indicated, referencing something as being a first, second or the like should not be construed to imply a particular order. Also, something may be described as being "above" something else and, unless otherwise indicated, may instead be "below", and vice versa. Similarly, something described as being to the left of something else may instead be to the right, and vice versa. Like reference numerals refer to like elements throughout.

FIG. 1(a) shows a cross-sectional view of a traditional shaft-and-hub flywheel assembly 10 that displays limited performance at, for example, various frequencies and higher speeds. A fiber-composite rim rotor 12 is attached to hub 14 that, in turn, is attached to shaft 16. Attached to shaft 16, sintered permanent magnets (PMs) 15, and 18 exert attractive and repulsive forces on a lift PM 20 and a high temperature superconductor 22. PM 20 is shown attached to support 17. A stator coil 24 from the motor/generator (M/G) is shown suspended between the MG PM 26 and support 17.

FIG. 1(b) shows a cross-sectional view of a flywheel architecture 30 made according to the present disclosure. In this "hubless" open-core flywheel architecture (with dot-dashed line indicating a centerline), elastic permanent magnets (PMs) 34, 36 and 38 are shown affixed to a fiber-composite rim rotor 32. Lift bearing stator PM 48 and stator coil 42 from the motor/generator (M/G) are attached to support structure 43. High temperature superconductor (HTS) 45 is positioned proximate to support 46. PMs 48 and 34 comprise the lift bearing, and elements 45 and 38 comprise the stability bearing.

The open-core architecture of the present disclosure presents a novel design that enables the fiber-composite rim and the HTS bearing to achieve maximum performance without the design limitations of component radial growth disparities inherent in the shaft-and-hub flywheel design. It is understood that the entire open-core flywheel 30 in its shown vertical orientation, is contained within a vacuum chamber (not shown). In a preferred vertical orientation, the ring-shaped rotor 32 is preferably suspended by a passively stable magnetic bearing, comprising a lift bearing (PM 48 and PM 34) at one end or "top" and a HTS stability bearing (PM 36 and PM 45) at a second end, or "bottom". Preferably, a brushless PM motor/generator 40 delivers power in and out of the rotor. As shown in FIG. 1(b), the rotor PMs 34, 36 and 38 are positioned along the inner surface of the rotor 32. The coldhead of a small cryocooler (not shown) thermally conducts to the HTS stability bearing 45 to maintain a desired temperature of from about 30 K to about 90 K, and preferably about 60 K. A small turbo-molecular or getter-sublimation pump (not shown) maintains the vacuum inside the chamber (not shown).

The use of the HTS bearing is important to alternatives of the present disclosure and allows the flywheel rotors to rotate at high velocity and take advantage of the benefits of the open-core architecture. The HTS bearing remains passively stable so long as the temperature of the HTS components remains below 80 K. The heat capacity of the HTS combined with low heat leak into the HTS results in the ability to maintain a sufficiently low temperature to keep stability and operate the bearing.

In earlier known HTS bearings, the HTS elements were bathed in liquid nitrogen. Advanced HTS bearings do not require a liquid cryogen. FIG. 2 shows schematically the HTS part of the system 60 according to the present disclosure, including the cryogenic cooling. Cryocooler 64 comprises coldhead 66. Coldhead 66 connects to cables 68 that may be flexible, and that preferably act as thermal conductors at cryogenic temperature. The cables preferably comprise copper, copper alloys, aluminum, aluminum alloys, and combinations thereof, etc. Cables 68 connect to a preferably flat, thermally conducting plate 70 by means of a conducting lug 72. HTS element 62 rests on top of thermally conducting plate 70. Thermally conducting plate 70 preferably rests on, and is supported by non-thermally conducting plate 74. Lugs 72 preferably penetrate non-thermally conducting plate 74 through openings in plate 74 in one or more places, and preferably do not touch plate 74. Plate 74 is mechanically connected by a non-thermally conducting support 76 that connects to ground support 78. The cryogenic portion of the system may be covered in one or more sheets of film (not shown) having a low emissivity to reduce heat input to the system by means of radiation.

This configuration is similar to the stator component of a superconducting stability bearing used in a 5-kWh, 3 kW flywheel assembly as reported in Materials Science and Engineering B 151 (2008) 195-198 M Strasik, J. R. Hull, P. E. Johnson, J Mittleider, K. E. McCrary, C. R. McIver, A. C. Day, *Performance of a Conduction-cooled High-temperature Superconducting Bearing*. As indicated by the experimental bearing loss values, the presence of the copper thermal bus under the HTS elements did not significantly increase the bearing loss. The gap is the distance between the bottom of the flywheel rotor magnet and the top of the HTS crystals. A gap of from about 2 mm to 4 mm is preferred for the HTS bearing. The rotational loss in an HTS bearing is proportional to $(\Delta B)^3/Jc$, where $\Delta B$ is the inhomogeneity of the magnetic field of the PM component measured in the rotational direction, and Jc is the critical current density in the HTS.

According to further variations of the present disclosure, for the HTS bearing to operate optimally, the stator part of the bearing preferably must be kept at cryogenic temperatures of lower than about 80 K, and more preferably from about 30 K to about 80 K. This is accomplished by establishing a flexible mechanical connection with high thermal conductance between the support base for the bulk HTS and the coldhead of a cryocooler. One preferred cryocooler contemplated for inclusion in the preferred flywheel systems of the present disclosure is the Sunpower Cryotel™ (SunPower Inc., Athens, Ohio). The preferred cryocooler is a linear, free-piston, integral Stirling-cycle machine that uses air bearings and has no friction-based failure modes, and has the ability to provide up to about 15 W of cooling at about 77 K. In addition, the preferred cryocooler has the ability to throttle input power when less cooling is required, and should provide cooling to the HTS bearing for flywheel sized up to about 100 kWh.

According to further alternatives of the present disclosure, the M/G works as a conventional radial-gap brushless design in that in motor mode currents pass through the stator coils in a timed manner to interact with the magnetic field of the rotor PMs to produce torque. In generator mode, the magnetic flux of the rotating PMs sweeps through the stator coils and produces voltage according to Faraday's law. At low speeds, a Hall-effect sensor measures the magnetic field from the M/G PMs to control the timing of the stator currents. At high speeds, the back electromagnetic field on the coils provides the input for this control. In a conventional radial-gap M/G, the stator coil is typically located radially outward from the PMs. However, according to preferred variations of the present disclosure, in the preferred open-core design, the locations are reversed, with the stator coils located radially inward of the PMs, as shown in FIG. 1(b).

Figure 3:
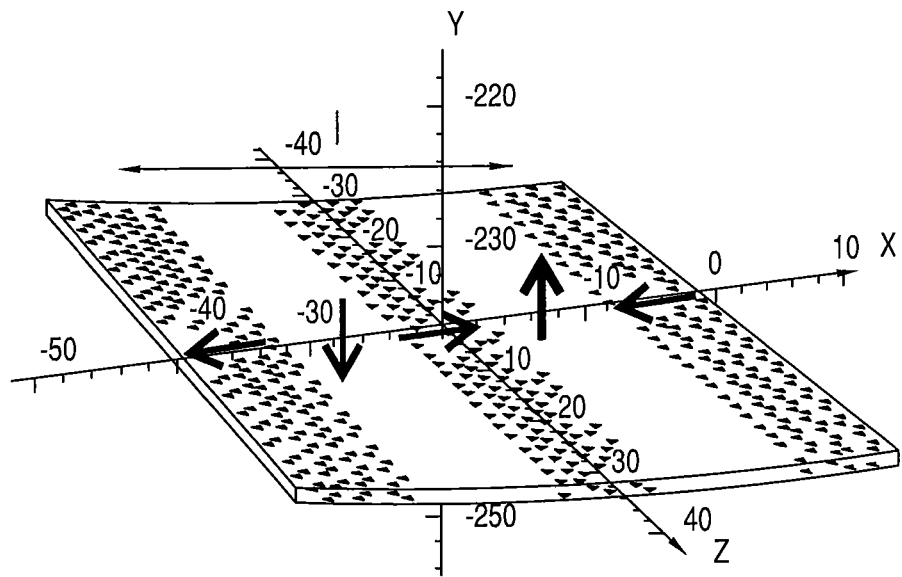
FIG. 3 is a grid showing directional magnetization of a low-order Halbach array.
Figure 4:
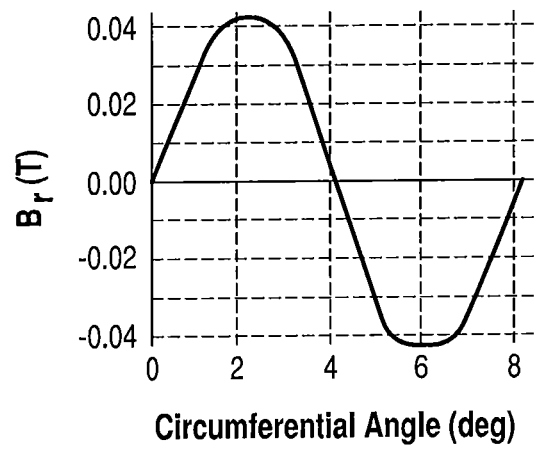
FIG. 4 is a graph showing radial magnetic field over complete pole pitch frequency.

According to the present disclosure, the PMs of the open-core M/G are magnetized in a low-order Halbach array, as shown in FIG. 3. The magnetization of a low-order Halbach array over a single pole length of 8 degrees is shown in the circumferential (x) direction. The value "z" represent the vertical and "y" the radial directions. The thinness of the bonded magnet shell dictates that the circumferential pole length cannot be too great without severely limiting the available flux and distorting the desired sinusoidal waveform in the stator core. The pole length should be greater than about 10 times the gap between the rotor PM inner radius and the stator coil outer radius. Experimental calculations for an example flywheel, shown in FIG. 4 indicate that a 90-pole machine, with a gap of about 5 mm between PMs and stator, provides sufficient flux and waveform. FIG. 4 shows a radial magnetic field over complete pole pitch λ at 5 mm radially inward from the PMs shown in FIG. 3. The preferred maximum electrical frequency for such a M/G is about 30 kHz. A stator comprising Litz wire windings without a ferromagnetic core is sufficient to provide the required power output without creating a substantial eddy current or other parasitic loss.

The high speed of the rotor and the large number of poles create a high power density. Further, for the relatively low power requirements of the flywheels made according to certain variations of the present disclosure, the radial thickness of the stator windings is relatively small, such as, for example, from about 1 mm to about 10 mm.

Figure 5:
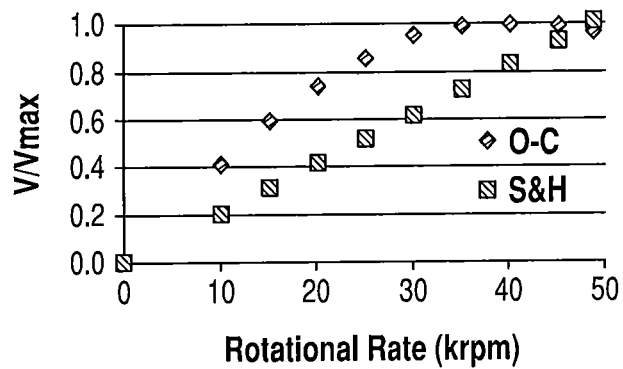
FIG. 5 is a graph comparing the rotational rates and voltages of the open-core and shaft-and-hub flywheels.

One significant advantage of the open-core flywheel architecture of the present disclosure is that rotor growth with speed significantly widens the speed range over which the power electronics can efficiently extract energy from the flywheel. According to the open-core architecture of the present disclosure, the rotor's dimension grows radially as the flywheel speed increases. In addition, as the PMs of the M/G move farther away from the stator coils, the magnetic flux through the coil diminishes. This results in a voltage that is relatively constant over the upper speed range of the flywheel. An example calculation for the outer flywheel of the design is shown in FIG. 5. The rotor radius increases by about 4.2 mm in increasing speed to about 48,500 rpm. Standard power electronics can typically remove energy from the flywheel when the generator voltage is between about 0.6 to about 1.0 of the maximum design value. This limits the available energy from a shaft-and-hub flywheel to 64% of the maximum kinetic energy. As seen in FIG. 5, in the open-core design of the present disclosure, 60% of the maximum voltage is available for speeds greater than about 15,000 rpm, and over 90% of the maximum kinetic energy is available for the load. In the example shown in FIG. 5, the maximum voltage occurs at about 40,000 rpm, and decreases slightly at speed in excess of about 40,000 rpm.

Figure 6:
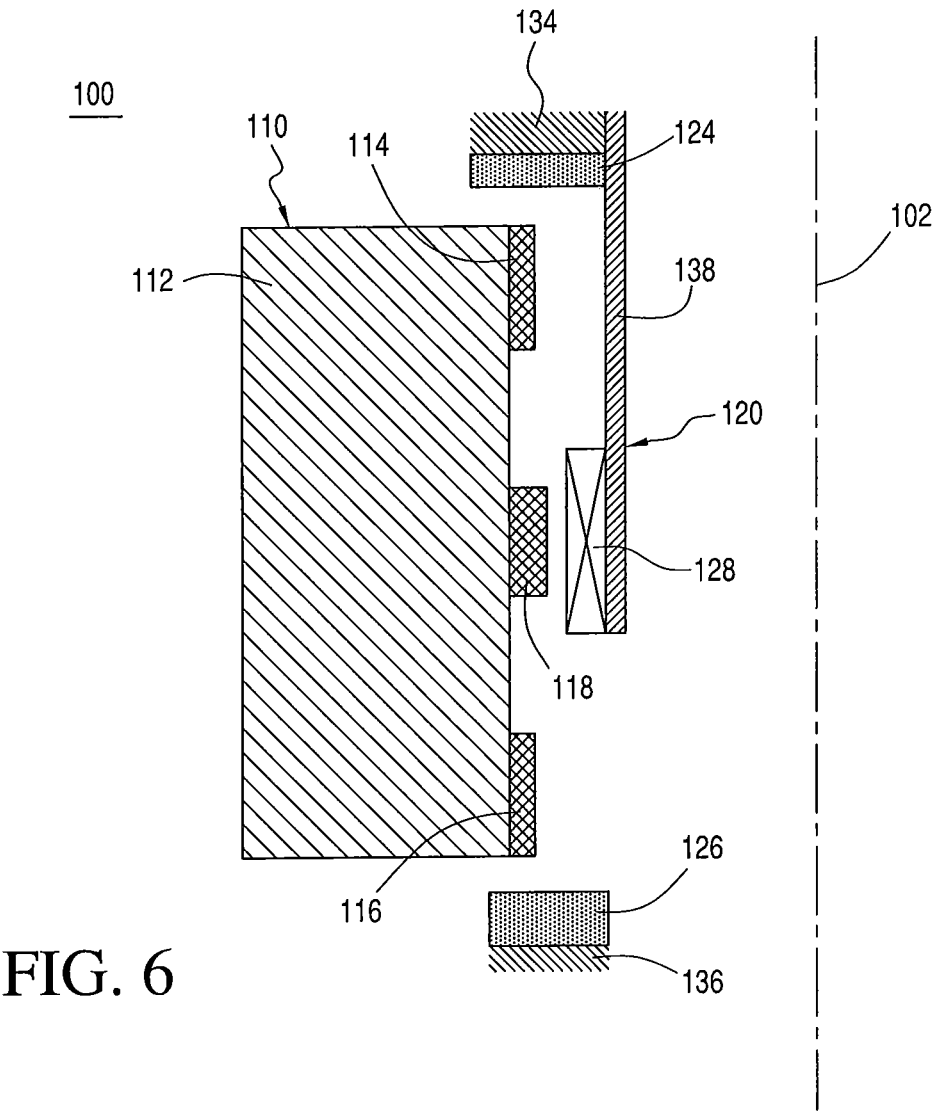
FIG. 6 is a close-up cross-sectional view of an alternate of the flywheel assembly shown in FIG. 1(b)

FIG. 6 shows a variation of the present disclosure where an open-core flywheel 100 is concentric about a centerline 102. The flywheel comprises rotor 110 and stator 120. Rotor 110 preferably comprises a fiber-composite rim 112, an upper stability bearing permanent magnet (PM) 114, a lower stability bearing PM 116, and a motor/generator PM array 118. The stator 120 comprises an upper stability bearing HTS array 124, a lower stability bearing HTS array 126, a stator coil assembly 128, and mechanical supports 134, 136 and 138. Mechanical support 134 supports the upper stability bearing HTS 124. Mechanical support 136 supports lower stability bearing HTS array 126. Mechanical support 138 supports stator coil assembly 128. The mechanical supports 134, 136 and 138 are fixedly attached to a vacuum chamber (not shown) that surrounds flywheel assembly 100. It is understood that while supports 134 and 138 are shown immediately adjacent to one another, such supports may be spaced a desired distance from one another. Flywheel rotor 110 is magnetically levitated via the magnetic bearing components, including the upper stability bearing (comprising rotor PM 114 and stator HTS 124), and the lower stability bearing (comprising rotor PM 116 and lower stator HTS array 126). Rotational acceleration of rotor 110 about centerline 102 is achieved by the electromagnetic interaction between the rotor PM 118 and the stator coil 128. Mechanical support 136 thermally insulates the HTS array 126 from the ground. There is also typically a thermally conducting structure (not shown) located between the HTS array 126 and thermally insulating structure 136 that connects HTS array 126 to a cold source, e.g. a cryocooler, etc. as shown in FIG. 2. Similarly, mechanical support 134 thermally insulates the HTS 124 from the ground, and there is typically a thermally conducting structure (not shown) positioned between HTS 124 and support 134 that connects HTS 124 to a cold source.

Figure 7:
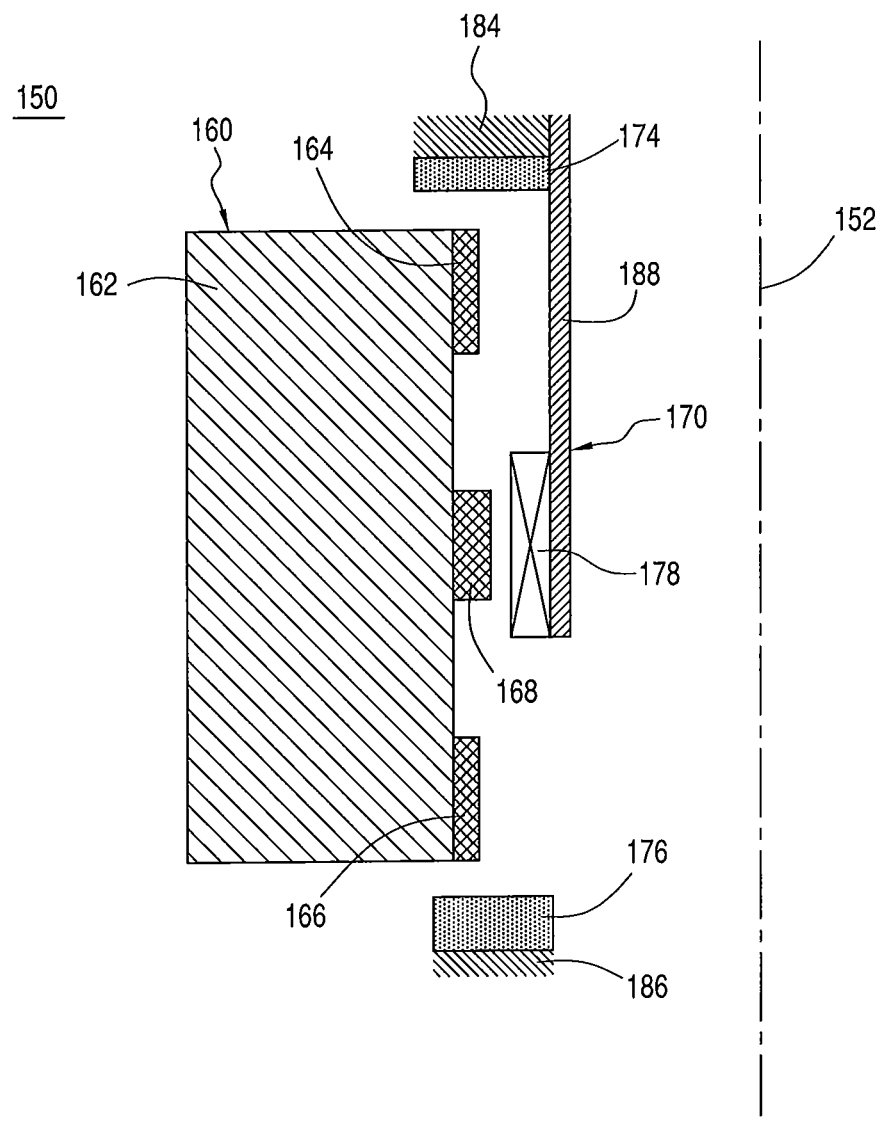
FIG. 7 is a close-up cross-sectional view of the flywheel assembly shown in FIG. 1(b)
Figure 8A:
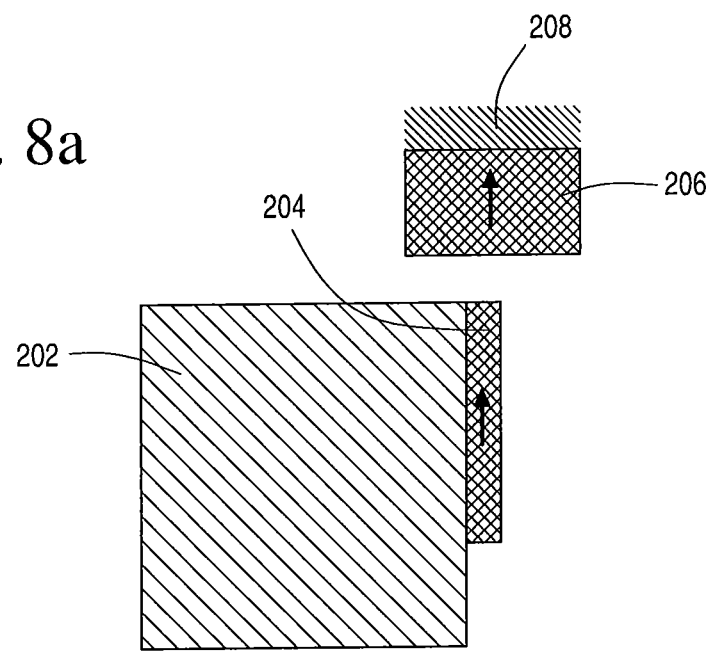
Figure 8B:
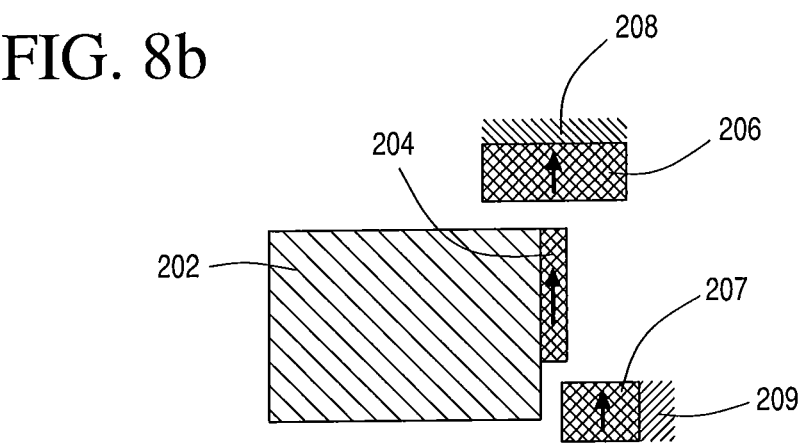
Figure 8C:
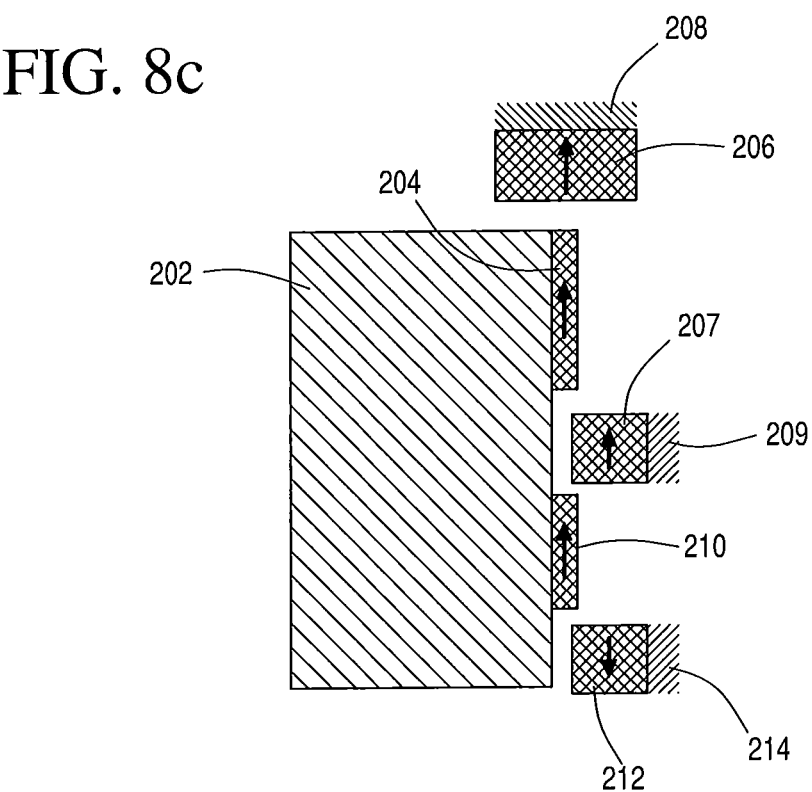
Figure 8D:
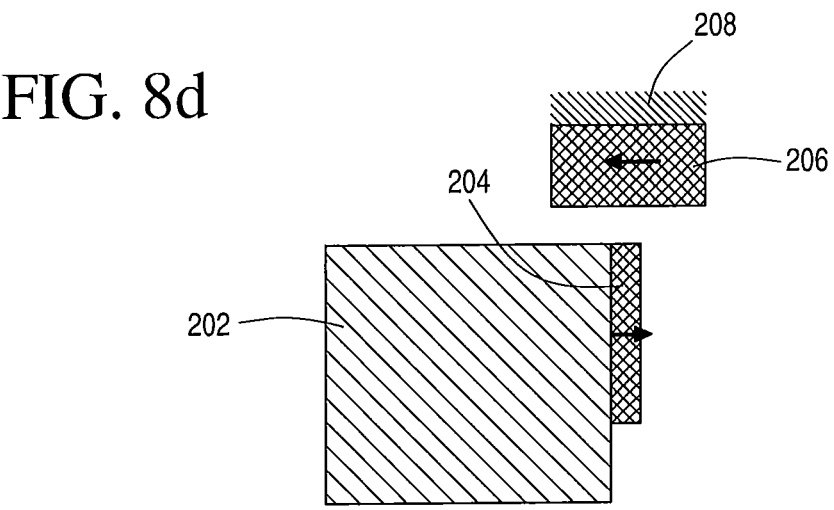

FIG. 7 shows a further variation of the present disclosure where the open-core flywheel 150 is concentric about a centerline 152. The flywheel comprises rotor 160 and stator 170. Rotor 160 comprises a fiber-composite rim 162, lift bearing PM 164, stability PM 166, and a motor/generator PM array 168. The stator 170 comprises a lift bearing PM 174, a HTS assembly 176, a stator coil assembly 178, and mechanical supports 184, 186 and 188. Mechanical support 184 supports stator lift bearing PM 174. Mechanical support 186 supports HTS array 176. Mechanical support 188 supports stator coil assembly 178. The mechanical supports 184, 186 and 188 are fixedly attached to a vacuum chamber (not shown) that preferably surrounds flywheel assembly 150. Flywheel rotor 160 is magnetically levitated via the magnetic bearing components, including the lift bearing (comprising rotor PM 164 and stator PM 174), and the stability bearing (comprising rotor PM 166 and stator HTS 176. Rotational acceleration of rotor 160 about centerline 152 is achieved by the electromagnetic interaction between the rotor PM 168 and the stator coil 178. Mechanical support 186 thermally insulates the HTS array 176 from the ground. There is also typically a thermally conducting structure (not shown) positioned between the HTS bearing assembly 176 and thermally insulating structure 186 that connects HTS 176 to a cold source, such as, for example, a cryocooler, etc., as shown in FIG. 2.

A number of configurations are contemplated by the present disclosure regarding the lift bearing in the novel open-core flywheel assemblies. FIG. 8(*a*) is directed to one variation showing an upper portion of the flywheel assembly. PM 204 is attached to the upper part of composite rim 202. Stator PM 206 is located vertically above PM 204, and is attached to mechanical support 208. The black arrows in FIG. 8(*a*) designate the preferred direction of magnetization. In this example, there is an attractive force upward on PM 204 that helps lift the rotor 202 against the force of gravity. In this variant, the stator PM 206 is sufficiently wide such that the attractive force is nearly uniform as the rotor composite rim 202 grows outward radially.

Another variation of the lift bearing is shown in FIG. 8(*b*), showing a second stator PM 207 located below and radially inward from rotor PM 204. The magnetic force in this case is repelling, and the location of the stator PM 207 below the rotor PM 204 preferably provides an additional upward force on the rotor 202. It is understood that additional magnets may be added to increase the force as indicated in FIG. 8(*c*). In this instance, there is an additional attractive force with resulting additional upward force on rotor 202, between the interactions of stator PM 207 and rotor PM 210. There is also an additional repulsive force, with resulting upward force on the rotor, between the interactions of rotor PM 210 and stator PM 212.

As shown in FIG. 8(*d*) additional alternatives of the present disclosure contemplate magnetizations that are not vertical, e.g. radial magnetization, etc. FIG. 8(*e*) shows additional PM 207 attached to mechanical support 209.

Further variations of the present disclosure contemplate orienting the stability bearing into different arrangements. FIG. 9(*a*) shows the magnetization of PM 116 as it would exist in FIG. 6. In FIG. 9(*b*), an alternative shows HTS 306 located radially inward from the stability bearing PM 304. In this orientation, PM 304 is magnetized in the radial direction. While FIG. 9(*b*) shows the magnetization direction as radially inward, it is understood that such magnetization could be directed radially outward.

The high speed of the rotor contemplated in the present disclosure, and the large number of poles, create a high power density. Further, the radial thickness of the stator windings is small for the relatively low power requirements of the flywheels of the present disclosure. Since the stator windings are supported from the top of the vacuum chamber, contemplated by the present disclosure include the beneficial presence of multiple rotors. For example, as shown in FIG. 10, a flywheel assembly 330 within a vacuum chamber having a chamber wall 332 comprises a first, or outer rotor 334 having an outer rotor radius with an outer brushless PM M/G stator 336 associated with the outer rotor 334. An outer PM lift bearing 338 is located above outer rotor 334, and an outer HTS bearing 340 is located below outer rotor 334. Inner rotor 342 has an inner rotor radius that is less than the outer rotor radius, and is therefore positioned at a location radially inward from the outer rotor 334. Inner PM lift bearing 344 and inner HTS bearing 346 are shown positioned respectively above and below the inner rotor 342. Inner brushless PM M/G stator 348 is shown located radially inward from inner rotor 342. A cryocooler 350 is shown located near the center of the flywheel assembly 330, positioned above a vacuum pump 352. The vacuum pump 352 is preferably a small turbo-molecular pump or getter-sublimation pump. A coldhead (not shown) of a small cryocooler thermally conducts to the HTS bearings 340, 346 to keep them at a preferred operating temperature of from about 30 K to about 80 K.

In a variation of the present disclosure, the vacuum chamber constitutes a significant portion of the weight of the flywheel assembly. Incorporating multiple nested rotors (in the preferred flywheel assemblies of the present disclosure) improves overall system energy and volume density. In a variation, a dual-rotor configuration, such as that shown in FIG. 10, the rotors are operated independently as independent flywheels. The inner rotor preferably has a maximum rim velocity that is significantly similar to the outer rotor, but will have a higher maximum rpm (circumferential velocity) by design.

In addition, FIG. 6 shows further alternatives where the lift bearing is replaced by a second stability bearing. The motor/generator PM 118 shown in FIG. 6, and discussed relative to FIGS. 3-5, shows magnetizations that are radial, circumferential, or a combination of the two.

FIG. 11 shows a further contemplated variation directed to an arrangement where the motor/generator PM has vertical magnetizations that alternate direction about the circumference. In FIG. 11, the rotor 460 of an open-core flywheel assembly preferably comprises a fiber composite rim 462, an upper PM 464, a lower PM 466 and a PM ring 468. It is understood that rotor 460 is substantially cylindrical, and that PMs 464, 466 and 468 are understood to preferably extend about the entire circumference of the inner surface of rotor rim 462. Centrally positioned PM 468 is shown magnetized according to the arrows, with the direction of magnetization alternating in the vertical upward or downward direction.

FIG. 12 shows an alternative for a rotor of the present disclosure. Rotor 510 of an open-core flywheel assembly preferably comprises a fiber composite rim 512, an upper PM 514, a lower PM 516 and a ladder-shaped copper conductor 518. It is understood that rotor rim 512 is substantially cylindrical, and that PMs 514, 516 and 518 are understood to preferably extend about the entire circumference of the inner surface of rotor rim 512.

In addition, according to the present disclosure, and as shown in FIG. 13, more than two rotors may be incorporated in the same vacuum chamber, further increasing the energy density of the flywheel assembly, with more than one flywheel sharing the same vacuum chamber. By being housed in the same vacuum chamber, the inner rotors essentially share a vacuum pump and cryocooler, etc., further reducing the required footprint for the flywheel system. The nesting of multiple rotors within one flywheel assembly can best be accomplished in an open-core architecture.

FIG. 13 shows a schematic of a system containing three rotors within one rotor assembly. The system 600 comprises three open-core substantially cylindrical flywheel assemblies "a", "b", and "c" labeled from inside outward relative to common centerline 602. Each rotor preferably comprises a fiber-composite ring 612, an upper PM 614 and lower PM 616, and a motor/generator PM 618. The lower PM 616 interacts with HTS 626 to form a stability bearing. The HTS 626 is mechanically supported by mechanical support 636. The upper PM 614 interacts with stator PM 624 to form a lift bearing. The motor/generator PM 618 interacts with stator coil 628 to accelerate the rotor in "motor" mode, or decelerate the rotor in "generate" mode. Each stator coil 628 a, b and c is mechanically supported by support 638. The three mechanical supports 638 a, b and c are shown connected to a single mechanical support 634.

In two-rotor variants, operating the two rotors in opposite directions reduces the net angular momentum of the total system and further facilitates transit of the flywheels operating at high speeds. If the two counter-rotating rotors have substantially the same rim velocity, radial thickness and height, the outer rim will have greater kinetic energy and angular momentum than the inner rotor. In this case the angular momentum cannot be completely cancelled. However, according to a further variation of the present disclosure, angular momentum is substantially negated and substantially cancelled by intentionally altering the height and/or radial thickness of the inner rotor. Radial thickness is often governed by the ability to address radial stress, whereas height is a parameter with fewer constraints.

Further, if design constraints for a desired flywheel system were to necessitate that both inner and outer rotor maintain the same the same height, the present disclosure contemplates incorporating a third rotor. In this design, angular momentum may be substantially completely negated by rotating two rotors (preferably the two inner rotors) in the same direction and rotating the remaining rotor in the opposite direction, for example. In each of the aforementioned scenarios and designs with multiple nested rotors, the kinetic energy of the rotors are added together to obtain the flywheel system's total system kinetic energy. The present disclosure is particularly advantageous in that the open-core architecture allows the vacuum pump and cryocooler to reside in the substantially cylindrical space inside the innermost rotor, thereby reducing the overall volumetric footprint of the system as compared to mounting these components on the top or bottom of the vacuum boundary. The rotor, bearing components and M/G stator are enclosed by a steel vessel that is evacuated to vacuum. Initial evacuation of the chamber is effected by any suitable pump, such as, for example, a roughing pump. The roughing pump may be removed, with the chamber then continually evacuated by a 70 ls$^{-1}$, 24 Vdc turbomolecular pump, for example, and preferably an associated backing pump.

In addition, the present disclosure, incorporating into an open-core flywheel architecture, rotor materials having significantly improved strength/density ratios, including preferred MWCNTs will increase flywheel rotor energy densities from presently known values of about 264 Wh/kg to at least about 473 Wh/kg, and a commensurate increase of and fiber tensile strength of from about 11 to about 63 GPa (an increase in energy density and strength of at least about 80% from known devices). Indeed, when wall thickness of the MWCNTs is normalized to the physical wall thickness of about 0.075 nm, theoretical wall strengths of at least about 63 GPa are achievable. It is further understood that single-walled CNTs (SWCNTs) are also contemplated by the present disclosure, and may be incorporated into the rotor components of the inventive flywheel assemblies presented herein, since SWCNTs may provide adequate or even superior mass efficient reinforcement. A typical SWCNT has a diameter of about 1.35 nm. Using this diameter with a 1 atom interatomic spacing volume fractions (Vfs) of only 39% are achievable. A diameter of 3 nm would yield Vfs of 60%. It is understood that the optimal CNTs for use in connection with variations of the present disclosure balance CNT diameter, achievable Vf, and efficiency of the CNT reinforcement.

According to preferred variations of the present disclosure, most of the flywheel rotor comprises a filament-wound fiber composite that is magnetically levitated by a HTS bearing. The HTS bearing comprises a PM rotor and HTS stator. Because of the superconducting properties of the HTS stator, the levitation is passive, requiring no significant feedback or active controls. The HTS stator preferably comprises an array of individual HTS crystals of yttrium-barium-copper oxide (YBCO), or other materials where Y is replaced by other rare earth elements such as, for example, Gd, Nd, Eu, etc., that are cooled by thermal conduction to the coldhead of a cryocooler to a temperature of from about 70 K to about 80 K. Preferably no cryogenic fluids (for example, liquid nitrogen, etc.) are required for bearing operation. The brushless M/G comprises a PM rotor and a stator preferably comprising copper windings in a ferromagnetic yoke. M/G stator cooling is accomplished by thermal conduction to the vacuum chamber walls. No parasitic energy is required for this function. An energy-absorbing containment liner is preferably placed between the rotating flywheel and the outer vacuum shell. It is preferred to keep the weight of both the vacuum chamber, and the stationary components inside the vacuum chamber to a minimum to meet the energy density requirements of the flywheel array. Other major components of the preferred system include a lift bearing, a touchdown bearing, and power electronics.

Useful applications for the flywheel systems of the present disclosure abound. Indeed, any required need for sustainable energy storage and deployment would find use and benefit from the present disclosure. For example, due to the substantially silent operation of the flywheel systems of the present disclosure, manned or unmanned vehicular operation in silent or stealth modes are made possible. In addition, the presently disclosed systems allow for rapid charging and discharging, as well as charging from all available energy sources such as, for example, grids, renewables, generators, etc. Further, no unique tooling or infrastructure is required to incorporate the variations of the present disclosure into stationary or mobile devices, systems or vehicles requiring uninterruptable and interruptible energy storage or deployment in mobile and stationary operation. Contemplated vehicles include manned and unmanned aircraft, spacecraft, terrestrial and surface and sub-surface water-borne vehicles. The modular approach to the open-core architecture design of the variations disclosed reduce the risk of total system failure and further enable a deeper depth of energy discharge (e.g. greater than about 95%) as compared to known flywheel systems. In addition, the systems allow for the very precise determination of charge based only upon monitoring the flywheel rotational speed.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. A flywheel assembly for storing and releasing energy comprising:
    a substantially cylindrical rotor assembly within a vacuum chamber, said assembly comprising a plurality of rotors, each rotor having an inner and outer surface and each rotor having a different radius;
    at least one stator assembly, each stator assembly in close proximity with a rotor assembly;
    at least one rotor magnet affixed to the inner surface of each rotor;
    at least one stator magnet affixed to each stator; and
    a high temperature superconducting bearing in communication with the rotor and stator assemblies;
    wherein the rotor magnet and stator magnet are positioned relative to one another to facilitate levitation of the rotor during operation.

2. The flywheel assembly of claim 1, wherein the assembly comprises an open-core architecture.

3. The flywheel assembly of claim 1, wherein the rotors comprise a material selected from the group consisting of: graphite, E-glass, S-glass, silica, aluminum, titanium, steel and combinations thereof.

4. The flywheel assembly of claim 1, wherein the rotors are made from a material comprising carbon nanotube-containing materials.

5. The flywheel assembly of claim 4, wherein the rotors comprise a single-walled carbon nanotube-containing material.

6. The flywheel assembly of claim 1, wherein a first rotor rotates in a first direction and a second rotor rotates in a second direction.

7. The flywheel assembly of claim 1, wherein the rotor assembly comprises three rotors having varying radii, and wherein two rotors rotate in a first direction, and a third rotor rotates in a second direction.

8. The flywheel assembly of claim 1, wherein the rotor assembly comprises rotors having varied dimensions, the dimensions preselected to substantially negate angular momentum.

9. A method for storing energy for subsequent release upon demand comprising the steps of:
    providing a substantially cylindrical rotor assembly within a vacuum chamber, said assembly comprising a plurality of rotors, each rotor having an inner and outer surface and each rotor having a different radius;
    providing at least one stator assembly, each stator assembly in close proximity with a rotor assembly;
    providing at least one of rotor magnet affixed to the inner surface of each rotor;
    providing at least one of stator magnet affixed to each stator;
    providing a high temperature superconducting bearing in communication with the rotor and stator assemblies;
    applying a current to the stator assemblies to rotate the rotor assembly to a predetermined speed of from about 300 m/s to about 3000 m/s; and
    positioning the rotor magnet and stator magnet relative to one another to facilitate levitation of the rotor during operation.

10. The method of claim 9, wherein the rotor assembly comprises an open-core architecture.

11. The method of claim 9, wherein the rotors comprise a material selected from the group consisting of: graphite, E-glass, S-glass, silica, aluminum, titanium, steel and combinations thereof.

12. The method of claim 9, wherein the rotors are made from a carbon nanotube-containing material.

13. The method of claim 12, wherein the carbon nanotube-containing material comprises a single-walled carbon nanotube-containing material.

14. The method of claim 9, wherein a first rotor rotates in a first direction and a second rotor rotates in a second direction.

15. The method of claim 9, wherein the rotor assembly comprises three rotors having varying radii, and wherein two rotors rotate in a first direction, and a third rotor rotates in a second direction.

16. The method of claim 9, wherein the rotor assembly comprises rotors having varied dimensions, and the dimensions are preselected to substantially negate angular momentum.

17. An energy storage system comprising the flywheel assembly of claim 1.

18. A vehicle comprising the flywheel assembly of claim 1.

* * * * *